(12) United States Patent
Kanemitsu et al.

(10) Patent No.: US 7,892,656 B2
(45) Date of Patent: Feb. 22, 2011

(54) SLIDING DEVICE

(75) Inventors: Hiroshi Kanemitsu, Toyota (JP);
Masaru Yoshikawa, Toyota (JP);
Masaharu Hatta, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 661 days.

(21) Appl. No.: 11/662,249

(22) PCT Filed: Sep. 29, 2005

(86) PCT No.: PCT/JP2005/017944
§ 371 (c)(1),
(2), (4) Date: Mar. 7, 2007

(87) PCT Pub. No.: WO2006/051656
PCT Pub. Date: May 18, 2006

(65) Prior Publication Data
US 2007/0266808 A1 Nov. 22, 2007

(30) Foreign Application Priority Data
Nov. 11, 2004 (JP) ............................. 2004-328164
Apr. 27, 2005 (JP) ............................. 2005-130576

(51) Int. Cl.
*B23P 9/00* (2006.01)
*F04B 27/10* (2006.01)
(52) U.S. Cl. .......................................... 428/687; 92/61
(58) Field of Classification Search ...................... None
See application file for complete search history.

(56) References Cited

U.S. PATENT DOCUMENTS 3,337,335 A * 8/1967 Fearnside .................... 148/413
5,056,417 A * 10/1991 Kato et al. ...................... 92/71

FOREIGN PATENT DOCUMENTS

| JP | 51-2414 | | 1/1976 |
| JP | 59107081 | A * | 6/1984 |
| JP | 61-117240 | | 6/1986 |
| JP | 02173212 | A * | 7/1990 |
| JP | 03-111522 | | 5/1991 |
| JP | 07113421 | A * | 5/1995 |
| JP | 10-153169 | | 6/1998 |
| JP | 2002-317757 | | 10/2002 |

* cited by examiner

*Primary Examiner*—Jennifer C McNeil
*Assistant Examiner*—Adam C Krupicka
(74) *Attorney, Agent, or Firm*—Flynn, Thiel, Boutell & Tanis, P.C.

(57) ABSTRACT

A sliding device 1 is constituted of a swash plate 3 including a first sliding surface 3A and a semispherical shoe 4 sliding with the swash plate 3. The swash plate 3 is constituted of a base material 3B of high strength brass containing Mn and Si, and very small granular Mn—Si compounds 6 are exposed on an inside of the base material 3B and on the first sliding surface 3A (surface of the base material 3B). The above described swash plate 3 increases in exposure amount of the Mn—Si compounds 6 exposed on the first sliding surface 3A by applying etching to the base material 3B after cutting the base material 3B. The sliding device 1 is favorable in seizure resistance and has a low manufacturing cost as compared with conventional sliding devices.

4 Claims, 6 Drawing Sheets

1: SLIDING DEVICE

ONLY CUTTING FINISH (SURFACE ROUGHNESS 0.8Rzjis)

AREA RATE:1.7%、AVERAGE GRAIN DIAMETER:4.6μm

ETCHING AFTER CUTTING FINISH (SURFACE ROUGHNESS 0.8Rzjis)

AREA RATE:6.6%、AVERAGE GRAIN DIAMETER:5.6μm

SLIDING DEVICE

TECHNICAL FIELD

The present invention relates to a sliding device, and more particularly relates to a sliding device including a swash plate and a shoe sliding with it.

BACKGROUND ART

Conventionally, as a sliding device used in a swash plate type compressor, the one including a swash plate having a flat first sliding surface formed on at least one end surface, and a shoe having a flat second sliding surface sliding with the first sliding surface of the above described swash plate is known (for example, Patent Document 1, Patent Document 2).

Patent Document 1: Japanese Patent Laid-Open No. 10-153169

Patent Document 2: Japanese Patent Laid-Open No. 2002-317757

DISCLOSURE OF THE INVENTION

Issues to be Solved by Invention

Incidentally, the above described conventional swash plate type compressor has come to be used recently under the condition of a high speed and a high load and under the condition with a small amount of lubricating oil. The operation conditions of the sliding device have become increasingly severe recently, and therefore, the swash plates and shoes significantly wear, and seizure of them easily occurs.

Conventionally, there are the sliding devices with high strength brass used as the material of the above described swash plates, and the swash plates using such high strength brass have the disadvantage of having low seizure resistance while their manufacturing cost is low.

Means to Solve the Issues

In view of the above described circumstances, the present invention is such that in a sliding device including a swash plate having a flat first sliding surface formed on at least one end surface, and a shoe having a flat second sliding surface sliding with the first sliding surface of the above described swash plate, the above described swash plate includes a base material constituted of high strength brass containing Mn and Si, and an Mn—Si compound is exposed on a surface to be the above described first sliding surface in the base material, and the above described shoe is constituted of an iron material and very small recesses and projections are formed on the second sliding surface of the shoe by laser quenching.

Effect of Invention

According to the above constitution, as is obvious from the test results which will be described later, the sliding device favorable in seizure resistance as compared with the conventional sliding devices and low in manufacturing cost can be provided.

BEST MODE FOR CARRYING OUT THE INVENTION

Describing the present invention with respect to embodiments illustrated in the drawings, a sliding device 1 is provided in a housing of a swash plate type compressor in FIG. 1. The sliding device 1 is constituted of a swash plate 3 mounted slantly to a rotary shaft 2 pivotally supported in the above described housing, and a plurality of shoes 4 sliding with the swash plate 3.

The swash plate 3 is formed into a disk shape, and both end surfaces in the swash plate 3 becomes flat first sliding surfaces 3A and 3A which slide with the shoes 4.

Meanwhile, the shoe 4 is formed into a semispherical shape as a whole, and is constituted of a flat second sliding surface 4A sliding with the first sliding surface 3A of the above described swash plate 3, and a semispherical convex surface 4B which is semispherical.

In the housing of the above described swash plate type compressor, a plurality of pistons 5 are disposed to be parallel with and surround the rotary shaft 2. A set of two shoes 4 are slidably held in an arc-shaped notched portion 5A formed at one end of each of the pistons 5, the notched portion 5A in this state is disposed to enwrap the outer peripheral portion of the above described swash plate 3, and the second sliding surfaces 4A of the shoes 4 of the set are allowed to abut on the first sliding surfaces 3A of the swash plate 3.

When the above described rotary shaft 2 is rotated, the swash plate 3 rotates, the first sliding surfaces 3A which are both end surfaces of the swash plate 3 and the second sliding surfaces 4A of the shoes 4 of each set slide, and with this, each of the pistons 5 are moved to advance and retreat in the axial direction via the shoes 4 of each set.

The above-described configuration remains the same as that of a conventional well-known sliding device.

Thus, the embodiment enhances seizure resistance of the sliding device 1 by improving the sliding device 1 including the above described swash plate 3 and the shoes 4 as follows.

Namely, the swash plate 3 of the embodiment is constituted of a base material 3B constituted of high strength brass containing 2 to 3.5 mass percent of Mn, and 0.5 to 1.5 mass percent of Si.

In the embodiment, the base material 3B constituted of the above described high strength brass is formed into a disk shape as a whole by cutting first, and thereafter, etching is applied to the entire region of the first sliding surface 3A to finish the work.

As shown in FIGS. 2 and 3, hard and very small granular Mn—Si compounds 6 are uniformly exposed on the inside of the base material 3B and the first sliding surface 3A. In the embodiment, by applying etching to the entire region of the first sliding surface 3A after cutting as described above, the exposed amount of the granular Mn—Si compounds 6 exposed on the first sliding surface 3A that is the surface of the base material 3B is increased.

The study of the inventor of the present application proves that the Mn—Si compounds 6 are exposed on the first sliding surface 3A and the inside of the base material 3B without applying etching to the first sliding surface 3A, but by applying etching, the exposed amount of the Mn—Si compounds 6 exposed on the first sliding surface 3A that is the surface of the base material 3B increases. Thus, in the embodiment, etching is applied to the first sliding surface 3A that is the surface of the base material 3B after cutting work.

Etching is performed by submerging the base material to be the swash plate 3 after cutting work into the solution for etching containing sulfuric acid and hydrogen peroxide solution.

FIG. 4 is an enlarged photograph of the first sliding surface 3A (surface) that is the surface of the base material 3B in the case where it is finished with only cutting and no etching is applied thereon. In FIG. 4, those displayed as very small black points are the granular Mn—Si compounds 6. As shown in FIG. 4, when no etching is applied with only cutting finish, the ratio of the area of the Mn—Si compounds 6 exposed on the first sliding surface 3A to the range of the first sliding surface 3A shown in FIG. 4 was 1.7%, and the average diameter of the grains of the exposed Mn—Si compounds 6 was 4.6 μm.

Since the Mn—Si compounds 6 are uniformly exposed on the entire region of the first sliding surface 3A, the ratio of 1.7% of the area of the Mn—Si compounds 6 exposed on the first sliding surface 3A in the range shown in FIG. 4 can be considered to be practically the ratio of the exposed area of the Mn—Si compounds 6 with respect to the entire region of the first sliding surface 3A. This is the same as in the above described embodiment in which etching is applied to the first sliding surfaces 3A.

Meanwhile, as shown in FIG. 5, in the embodiment in which etching is applied to the first sliding surface 3A of the base material 3B after the above described cutting is performed, the exposed amount of the granular Mn—Si compounds 6 exposed on the first sliding surface 3A (surface of the base material 3B) obviously increases as compared with the above described FIG. 4. In the embodiment shown in the above described FIG. 5, the ratio of the area of the Mn—Si compounds 6 exposed on the first sliding surface 3A was 6.6%, and the average diameter of the grains of the exposed Mn—Si compounds 6 was 5.6 μm.

As above, in the embodiment, by applying etching to the first sliding surface 3A of the base material 3B after cutting work, the Mn—Si compounds 6 exposed on the first sliding surface 3A are increased. Thereby, a number of very small projected portions are formed over the entire region of the first sliding surface 3A by the grains of Mn—Si compounds 6, and very small space portions continuing to one another are formed in the positions adjacent to the grains.

By applying etching to the first sliding surface 3A of the swash plate 3 after cutting work, very small burrs and scars occurring to the first sliding surface 3A at the time of cutting work can be removed.

Further, when machining such as cutting and lapping is applied to the above described first sliding surface 3A, if the ratio of the Mn—Si compounds 6 exposed on the first sliding surface 3A is to be enhanced, the roughness of the first sliding surface 3A becomes small. Thereupon, the first sliding surface 3A becomes inferior in wettability for holding lubricating oil.

On the other hand, in the case of the embodiment in which etching is applied to the first sliding surface 3A after cutting, the exposed amount of the Mn—Si compounds 6 is increased as described above without making the roughness of the first sliding surface 3A too small, and wettability of the first sliding surface 3A is made favorable.

Meanwhile, the shoe 4 of the embodiment is constituted of SUJ2 that is an iron material, projected portions 4a are formed in a lattice form on its flat second sliding surface 4A as shown in FIG. 7, and the portion other than the projected portions 4a are relatively made recessed portions 4b, whereby the surface with recesses and projections is formed on the above described second sliding surface 4A.

The above described projected portions 4a are formed by irradiating the above described second sliding surface 4A with laser, and directly quenching the second sliding surface 4A by irradiation. Namely, the irradiated portion irradiated with the above described layer is in the state in which the base material surface 4c forming the original surface of the second sliding surface 4A is directly quenched and bulges from the base material surface 4c, and thereby the projected portions 4a are formed, as shown in FIG. 8.

The portion irradiated with laser is in the state directly quenched like this, the recessed portions 4b, which are adjacent to the portions irradiated with laser and are not directly irradiated with laser, are not directly quenched, and the portions become non-directly quenched portions. The non-directly quenched portions relatively recess with respect to the above described projected portions 4a, and the recessed portions 4b are formed.

However, it is not that the recessed portion 4b which is the non-directly quenched portion is not quenched. Namely, the quenching range by irradiation of laser is semicircular in section with the irradiation position of the laser as the center as shown by the phantom line 7 in, for example, FIG. 8, and therefore, by narrowing the space of the adjacent irradiations of laser, quenching can be performed in the recessed portion 4b of the non-directly quenched portion which is in the middle of them. It can be set by the irradiation space of laser whether the portion of the recessed portion 4b that is the non-directly quenched portion is quenched or not. If the recessed portion 4b that is the non-direct quenched portion is quenched, the portion bulges from the base member surface 4c though it does not bulge so much as the convex portion 4a.

In the embodiment, after YAG laser is linearly irradiated to the second sliding surface 4A of the shoe 4 produced of SUJ2 to be parallel at the spaces of 0.2 mm, the YAG laser irradiates parallel at the spaces of 0.2 mm in the direction orthogonal to this, and the YAG laser 4 irradiates in the lattice form as a whole. The space is desirably in the range of 0.1 to 0.3 mm.

The output of the above described YAG laser is 50 W, and the YAG laser irradiates by adjusting the condenser lens so that the YAG laser comes into focus in the position at the depth of 2 mm with respect to the surface of the second sliding surface 4A, that is, in the state in which the YAG laser is out of focus with respect to the surface of the second sliding surface 4A.

The surface of the projected portion 4a that is the directly quenched portion irradiated with the above described laser increases in hardness by about Hv 100 with respect to Hv 750 that is the hardness of the base material, and the surface of the recessed portion 4b increases by about Hv 50. On the other hand, a portion 8 (see FIG. 8) that is a slightly deeper than the directly quenched portion is annealed and becomes lower in hardness than the base material by about Hv 100, the point of intersection of the projected portion 4a and the projected portion 4a that are the directly quenched portions, that is, the portion where the portions irradiated with laser intersect each other is also annealed, and becomes lower in hardness than the base material by about Hv 100. However, quenching by laser is abruptly cooled, and therefore, reduction in hardness of the base material is not recognized in the position deeper than the above described slightly deeper portion 6.

In the embodiment, after laser is irradiated to the second sliding surfaces 4A of the shoe 4 as described above, lapping and buffing are applied in sequence and the shoe is completed. The height of the projected portion 4a with respect to the above described recessed portion 4b is about 0.1 to 10 μm immediately after laser treatment, and is desirably in the range of 0.1 to 1 μm in the finished product after lapping and buffing.

In the embodiment, SUJ2 is used as the material of the shoe, but the material is not limited to this, and it goes without saying that other iron materials may be used.

Next, FIG. 6 shows the result of the test of seizure resistance which was conducted with respect to the sliding device 1 of the embodiment constituted of the swash plate 3 and the shoe 4 adapted as described above, and the sliding device (prior art) including the conventional ordinary swash plate. The test conditions are as follows.

Rotational frequency of the swash plate: 9000 rpm (the rotational frequency is increased by 1000 rpm for one minute for each of nine steps)

Contact pressure: preload 2.7 MPa Contact pressure is increased every minute by b2.7 MPa until seized.

Oil mist amount: 0.05 g/min

Oil: refrigerating machine oil

Seizure determination: Axial torque max. 4.0 N/m

The prior art shown in FIG. 6 uses the swash plate which is made by cutting the conventional ordinary high strength brass as the swash plate, and uses the shoe of the same structure as the above described embodiment as the shoe.

As can be understood from FIG. 6, the seizure loads of the sliding device which is the prior art using the conventional swash plate are all 5 MPa or less. On the other hand, the seizure loads of the sliding device 1 of the embodiment are all 15 MPa or more, and it can be understood that the sliding device 1 includes excellent seizure resistance.

As the reason of the sliding device 1 of the embodiment including excellent seizure resistance like this, the following matter is conceivable.

Namely, a number of granular Mn—Si compounds are uniformly exposed on the first sliding surface 3A of the swash plate 3, and they are in the state slightly bulging from the surface of the original base material 3B (see FIGS. 2 and 3). Therefore, when the second sliding surface 4A of the shoe 4 as the counterpart member and the first sliding surface 3A of the swash plate 3 slide, the contact pressure acting on the first sliding surface 3A of the swash plate 3 from the second sliding surface 4A of the shoe 4 is supported by a number of Mn—Si compounds 6 and reduced. Therefore, the contact pressure acting on the first sliding surface 3A of the swash plate 3 from the shoe 4 can be reduced more than in the sliding device using the conventional ordinary swash plate.

Further, in the embodiment, a number of Mn—Si compounds 6 are granular and exposed on the first sliding surface 3A of the swash plate 3, whereby very small space portions continuing to one another exist in the positions adjacent to them, and the very small space portions function as the flow passage of the lubricating oil.

Further, in the case of the embodiment in which etching is applied to the first sliding surface 3A after cutting, the exposed amount of the Mn—Si compounds 6 is increased without making the roughness of the first sliding surface 3A too small, and thereby, wettability of the lubricating oil to the first sliding surface 3A becomes favorable.

It is conceivable that for the above reason, the sliding device 1 of the embodiment includes excellent seizure resistance as described above.

As described above, according to the embodiment, less expensive high strength brass is used as the swash plate 3, and therefore, the sliding device 1 at low manufacturing cost and excellent in seizure resistance can be provided.

By applying etching to the first sliding surface 3A after cutting, very small burrs and scars occurring to the first sliding surface 3A at the time of cutting can be removed. The manufacturing cost of the sliding device 1 can be made low by the amount of omission of the working step for removing such burrs and the like.

Since a number of very small recesses and projections are formed by applying the above described laser quenching to the second sliding surface 4A of the shoe 4 of the embodiment, the load capacity of the second sliding surface 4A of the shoe 4 can be enhanced, and the sliding device 1 excellent in abrasion resistance can be provided ultimately.

Next, FIG. 9 shows a sectional view of the swash plate 3 of the sliding device 1 that is a second embodiment of the present invention. In the swash plate 3 of the sliding device 1 of the above described first embodiment, surface treatment is not applied to the first sliding surface 3A of the swash plate 3, but in the second embodiment, with the constitution of the swash plate 3 of the above described first embodiment as the precondition, Sn plating of a thickness of 0.3 to 3 μm is applied to the whole first sliding surface 3A. The other constitutions in the second embodiment are the same as those in the sliding device 1 of the above described first embodiment, and therefore, the explanation of them will be omitted.

Next, FIG. 10 shows the test result of the seizure resistance of the sliding devices 1 of the second embodiment and the prior arts 1 and 2. In the prior art 1, the swash plate is constituted of a high strength brass material containing Mn and Si, and the shoe is constituted of SUJ2 without laser quenching. Further, in the prior art 2, the swash plate is constituted of the same high strength brass material including Mn and Si as in the embodiment, with Sn plating applied to the sliding surface, and the shoe is constituted of SUJ2 without laser quenching.

The test conditions are as follows, the test was conducted twice on each of the prior arts 1 and 2 and the embodiment. The left side of each of the tested object shows the result of the first test, and the right side shows the result of the second test.

(Test Conditions)

Swash plate rotational frequency: the rotational frequency is increased by 1000 rpm for one minute for each of nine steps: Maximum rotational frequency 9000 rpm (circumferential speed 38 m/s)

Contact pressure: with preload 2.7 MPa, the contact pressure is increased by 2.7 MPa every minute: until seized Oil mist amount: 0.05 to 0.25 g/min Nozzle position fixed.

Oil: refrigerating machine oil

Seizure condition: Axial torque over 4.0 N/m

Namely, with the end surface of the shoe in pressure contact with the above described swash plate, the rotational frequency of the swash plate is increased under the above described conditions. On the other hand, the contact pressure on the occasion of bringing the shoe into pressure contact with the swash plate is increased under the above described conditions, and when the axial torque applied to the swash plate exceeds 4.0 N/m, it is determined that seizure occurred. This also applies to the prior arts 1 and 2.

As can be understood from the test result shown in FIG. 10, while the seizure loads of the sliding devices of the prior arts 1 and 2 are 8.1 MPa or less, that of the sliding device 1 of the second embodiment is 13.5 MPa or 16.2 MPa, and the sliding device 1 of the second embodiment obviously includes excellent seizure resistance as compared with the conventional sliding devices, and can obtain the same operation and effect as the above described first embodiment.

In the second embodiment, the first sliding surface 3A of the swash plate 3 at the time of start of use is constituted of Sn plating 3C, and therefore, conformability of the first sliding surface 3A of the swash plate 3 and the second sliding surface 4A of the shoe 4 can be enhanced.

In the second embodiment shown in FIG. 9, Sn plating is applied to the whole first sliding surface 3A of the swash plate 3, but as the surface treatment substituting as it, any one of solder alloy plating and resin coating may be adopted.

Next, FIGS. 11 and 12 show other embodiments when laser quenching is applied to the shoe 4. Namely, in FIG. 11, on laser quenching of the second sliding surface 4A of the shoe 4, laser is irradiated to the second sliding surface 4A with the locus of movement drawing equidistant parallel lines to form the projected portions 4a and the recessed portions 4b.

FIG. 12 shows that for the second sliding surface 4A of the shoe 4, quenching is performed by irradiating a laser onto the second sliding surface 4A so as to draw a number of concentric circles with the center of the second sliding surface 4A as the center. In this embodiment, the projected portions 4a are formed at the laser irradiation positions, and the recessed portions 4b are formed in the adjacent positions to them.

Further, FIG. 13 shows another embodiment in the case where laser quenching is performed for the shoe 4. In the embodiment shown in FIG. 13, laser is irradiated so that a number of circles are disposed in a staggered form all over the second sliding surface 4A of the shoe 4. Thereby, the position of each of the circles irradiated with laser becomes the projected portion 4a, and its inside and outside portions are formed as the recessed portions 4b.

DESCRIPTION OF SYMBOLS

Figure 1:
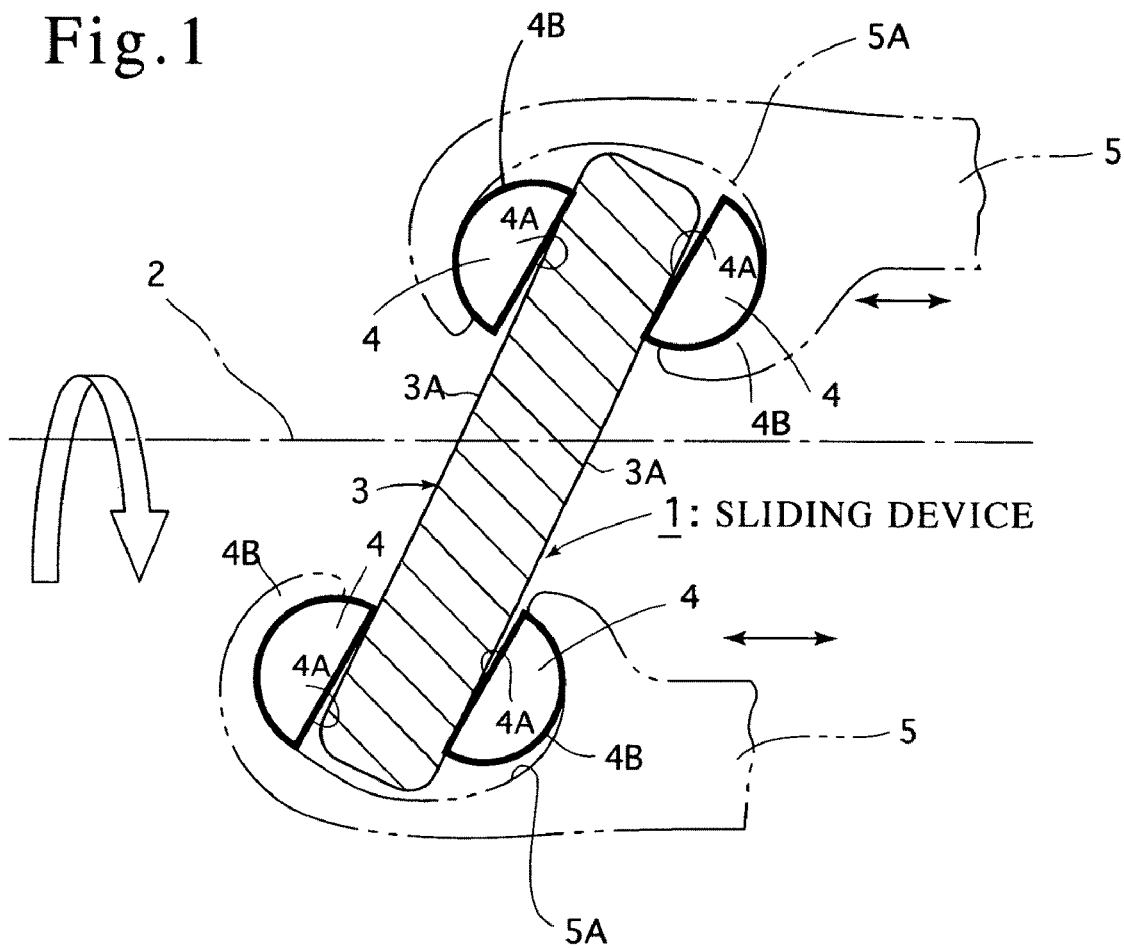
FIG. 1 is a sectional view of an essential part showing one embodiment of the present invention.
Figure 2:
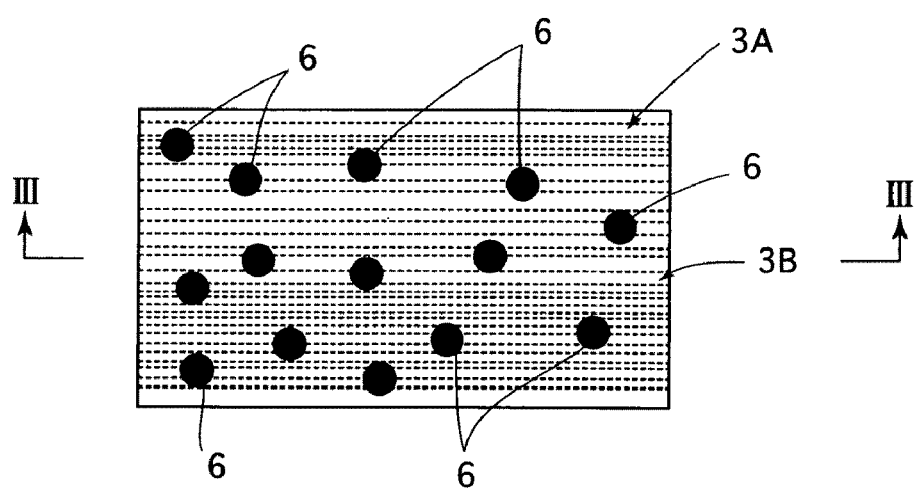
FIG. 2 is an enlarged view of a first sliding surface 3A of a swash plate shown in FIG. 1.
Figure 3:
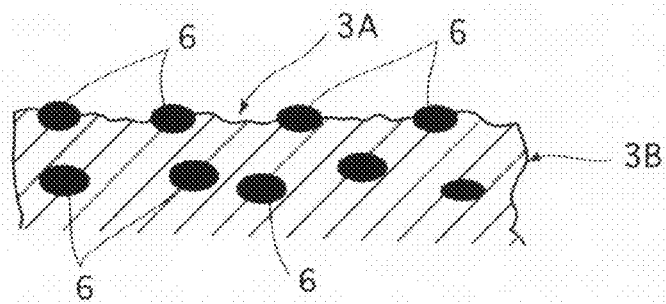
FIG. 3 is a sectional view taken along the line III-III of FIG. 2.
Figure 4:
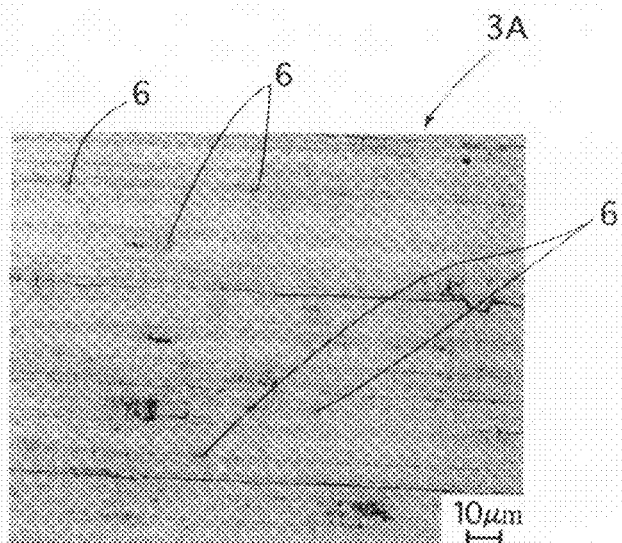
FIG. 4 is a view showing an enlarged photograph of the first sliding surface of the swash plate to which only cutting is applied.
Figure 5:
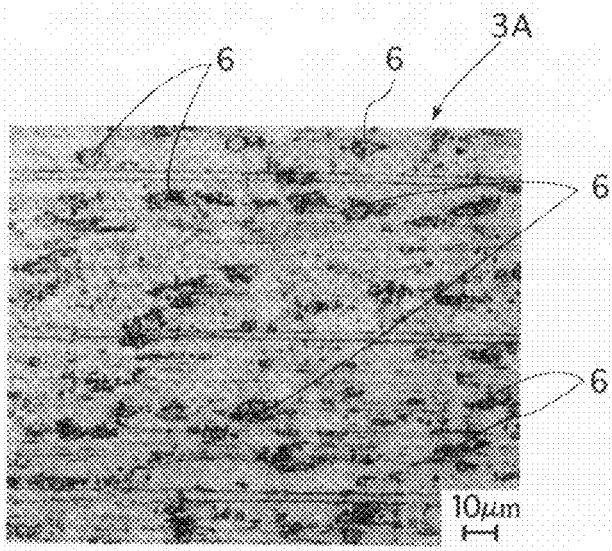
FIG. 5 is a view showing an enlarged photograph of the first sliding surface of the swash plate of the embodiment shown in FIG. 2.
Figure 6:
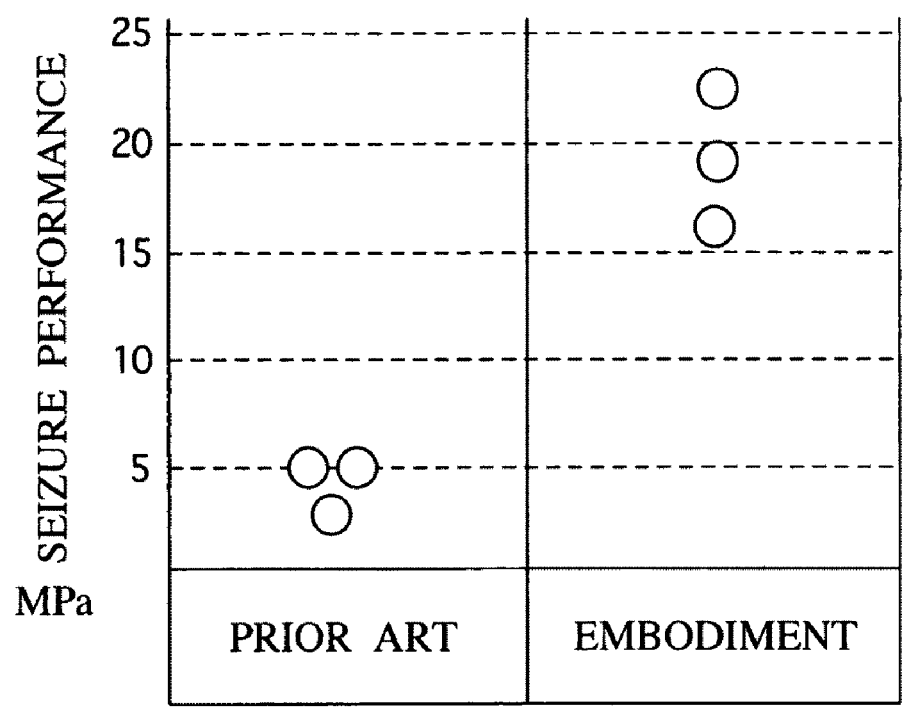
FIG. 6 is a diagram showing the test result of seizure resistance of the embodiment shown in FIG. 1 and a prior art.
Figure 7:
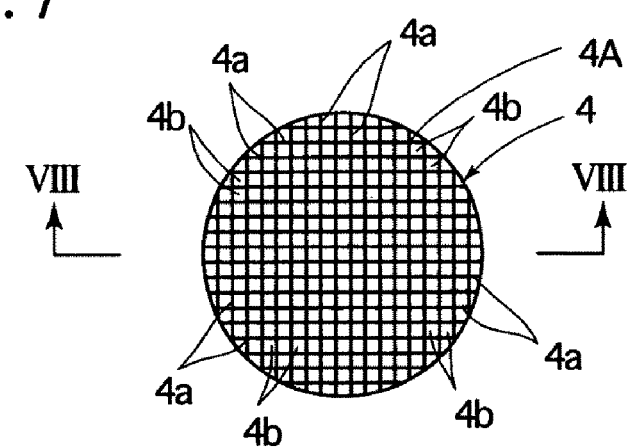
FIG. 7 is a front view of a second sliding surface 4A of a shoe 4 shown in FIG. 1.
Figure 8:
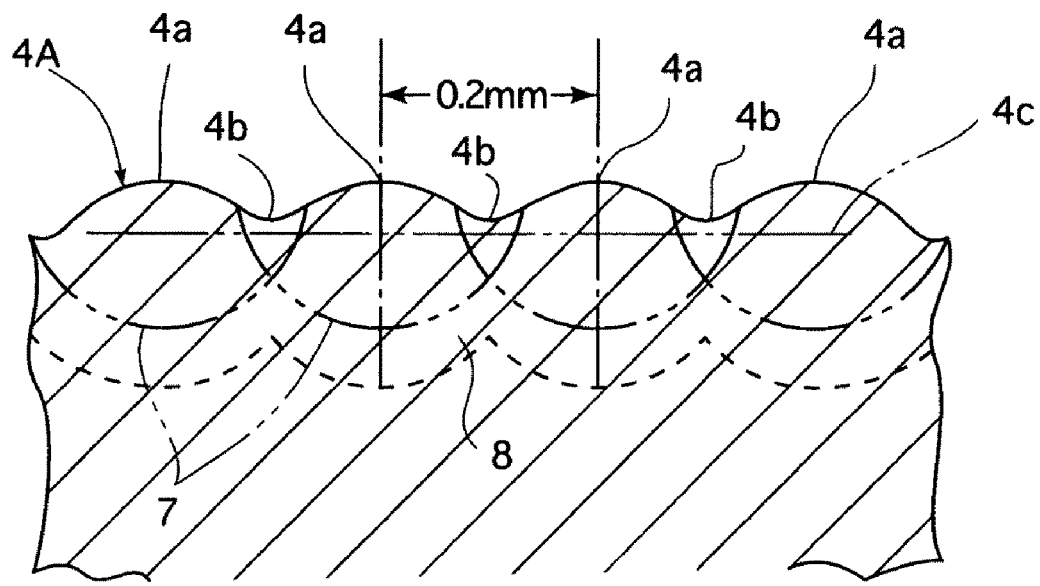
FIG. 8 is a sectional view of the essential part taken along the VIII-VIII line of FIG. 7.
Figure 9:
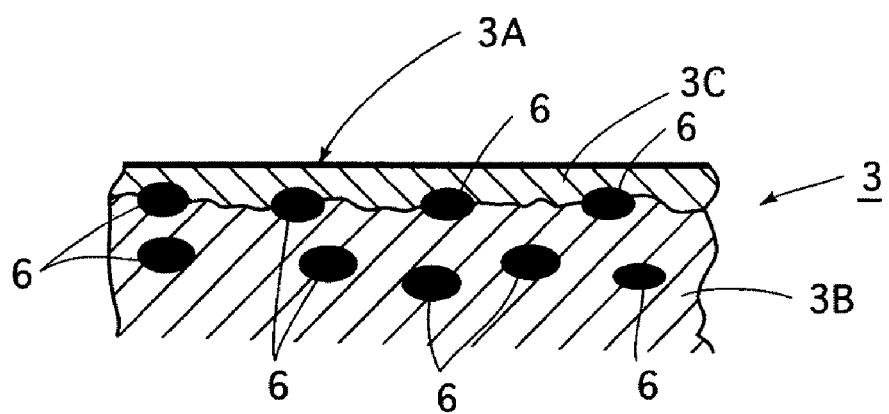
FIG. 9 is a sectional view of an essential part of a swash plate as a second embodiment of the present invention.
Figure 10:
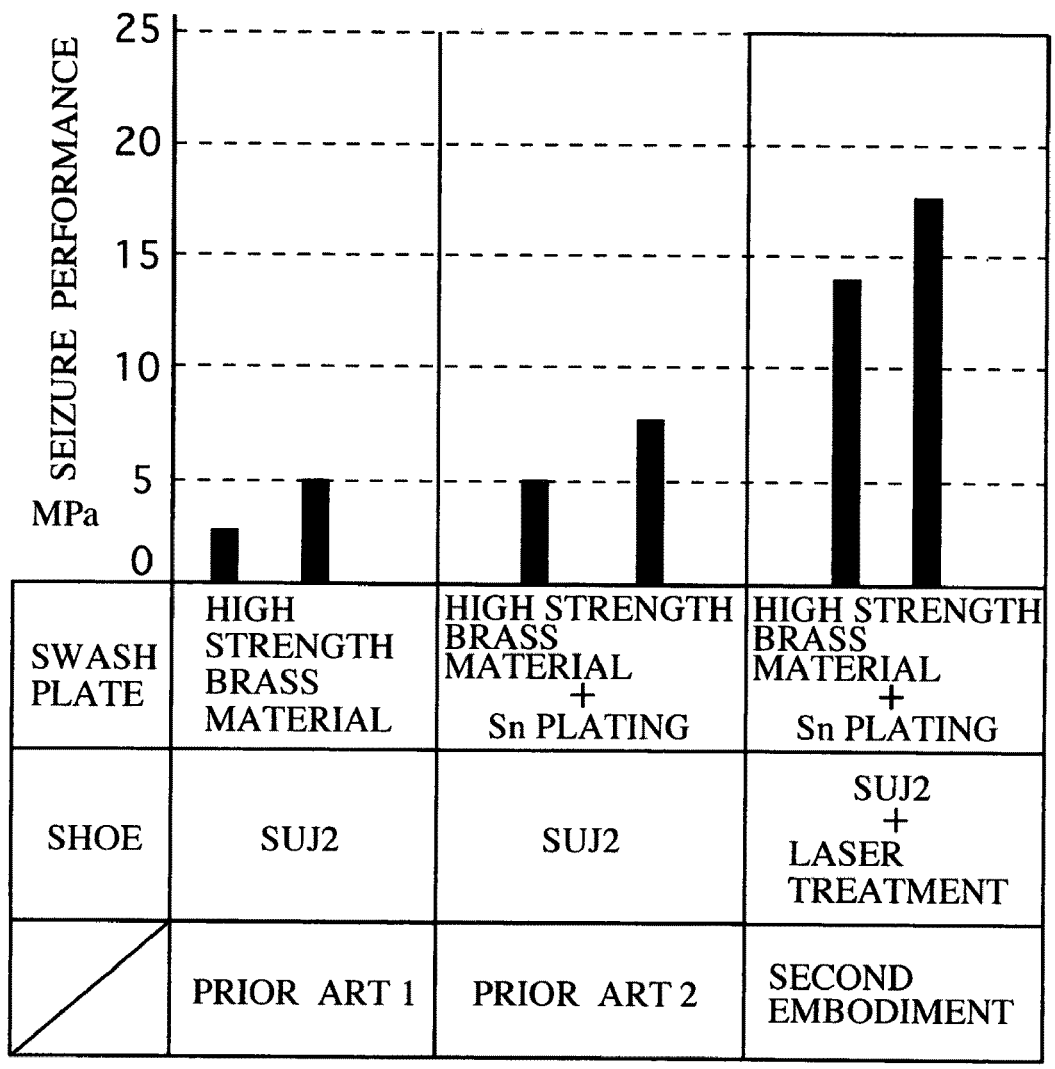
FIG. 10 is a diagram showing the test result of the seizure resistance of the second embodiment shown in FIG. 9 and the prior arts.
Figure 11:
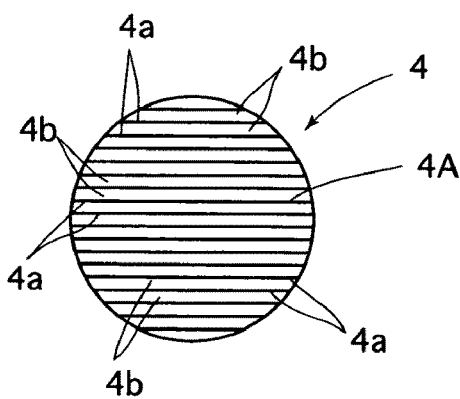
FIG. 11 is a front view of a second sliding surface showing another embodiment of the shoe.
Figure 12:
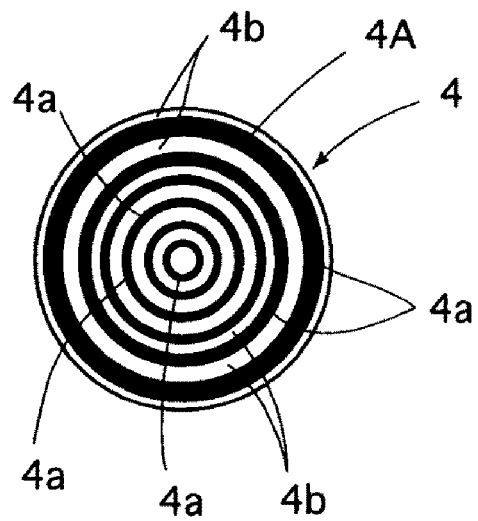
FIG. 12 is a front view of the second sliding surface showing another embodiment of the shoe.
Figure 13:
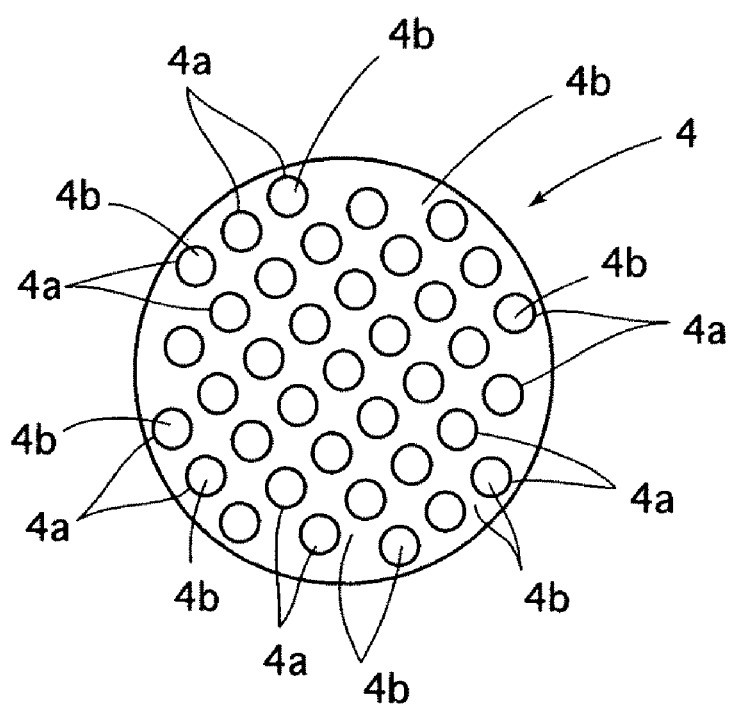
FIG. 13 is a front view of the second sliding surface showing another embodiment of the shoe.

| 1 | sliding device | 3 | swash plate |
| 3A | first sliding surface | 3B | base material |
| 4 | shoe | 4A | second sliding surface |
| 4a | projected portion | 4b | recessed portion |
| 6 | Mn—Si compound | | |

The invention claimed is:

1. A sliding device comprising a swash plate having a first sliding surface formed on at least one end surface and a shoe having a second sliding surface in sliding engagement with the first sliding surface, characterized in that said swash plate comprises a base material made of a high strength brass containing Mn and Si, with Mn—Si compounds being exposed as projections and space portions which are continuous with each other formed around the projections on the first sliding surface by subjecting the first sliding surface to an etching treatment to increase the exposed area of the projections on the first sliding surface and said shoe is made of an iron material and a plurality of staggered circles are formed on the second sliding surface by quenching, where each circle forms a projected portion not exceeding 10 µm in height and the inside and outside portions of the circular projections are formed as recessed portions.

2. The sliding device according to claim 1, characterized in that one of a Sn plating, solder alloy plating and resin coating is applied to the first sliding surface on which said Mn—Si compound is exposed.

3. The sliding device according to claim 1, characterized in that the base material of said swash plate is a high strength brass containing 2 to 3.5 mass percent of Mn and 0.5 to 1.5 mass percent of Si.

4. The sliding device according to claim 1, characterized in that said Mn—Si compounds exposed on the first sliding surface of said swash plate have an average diameter of 3 to 10 µm and a ratio of exposure area with respect to the area of the first sliding surface of 3 to 15%.

* * * * *